United States Patent
Nishimura

(10) Patent No.: US 8,238,209 B2
(45) Date of Patent: Aug. 7, 2012

(54) OPTICAL DISC APPARATUS, INFORMATION RECORDING METHOD AND INFORMATION RECORDING MEDIUM

(75) Inventor: Koichiro Nishimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 843 days.

(21) Appl. No.: 12/244,048

(22) Filed: Oct. 2, 2008

(65) Prior Publication Data

US 2009/0092013 A1     Apr. 9, 2009

(30) Foreign Application Priority Data

Oct. 4, 2007   (JP) ................................. 2007-260486

(51) Int. Cl.
    *G11B 7/00*      (2006.01)
(52) U.S. Cl. ............. 369/53.16; 369/47.14; 369/94
(58) Field of Classification Search ............ 369/47.14, 369/53.15–53.17, 94
    See application file for complete search history.

(56) References Cited

U.S. PATENT DOCUMENTS

| | | | | |
|---|---|---|---|---|
| 7,355,936 B2* | 4/2008 | Senshu | ...... | 369/47.24 |
| 7,876,652 B2* | 1/2011 | Senshu | ...... | 369/47.24 |
| 2003/0103429 A1* | 6/2003 | Senshu | ...... | 369/47.24 |
| 2003/0185128 A1* | 10/2003 | Shoji et al. | ...... | 369/59.25 |
| 2005/0182895 A1 | 8/2005 | Hwang | | |
| 2006/0126343 A1 | 6/2006 | Hsieh et al. | | |
| 2006/0238873 A1 | 10/2006 | Park et al. | | |
| 2009/0231985 A1* | 9/2009 | Senshu | ...... | 369/275.3 |

FOREIGN PATENT DOCUMENTS

| | | |
|---|---|---|
| JP | 2000-311346 | 11/2000 |
| JP | 2004-272055 | 9/2004 |
| JP | 2006-085797 | 3/2006 |
| JP | 2006-173624 | 6/2006 |
| JP | 2006-185509 | 7/2006 |
| JP | 2006-302863 | 11/2006 |
| JP | 2007-522601 | 8/2007 |

* cited by examiner

*Primary Examiner* — Thang Tran
*Assistant Examiner* — Huy D Nguyen
(74) *Attorney, Agent, or Firm* — Antonelli, Terry, Stout & Kraus, LLP.

(57) ABSTRACT

When executing an replacement process on a multi-layer recording optical disc, alternate recording regions are successively used starting at the nearest spare area from an objective lens regardless of the layer where the replacement process is generated. Alternatively, in the spare area of each layer, a priority spare area is provided for executing an alternation with a higher priority by shifting the radial position from the other layer. Alternatively, arrangement is performed so that the radial position or the alternative recording start radial position of the spare area of each layer is not superposed on the upper or the lower layer spare area.

6 Claims, 11 Drawing Sheets

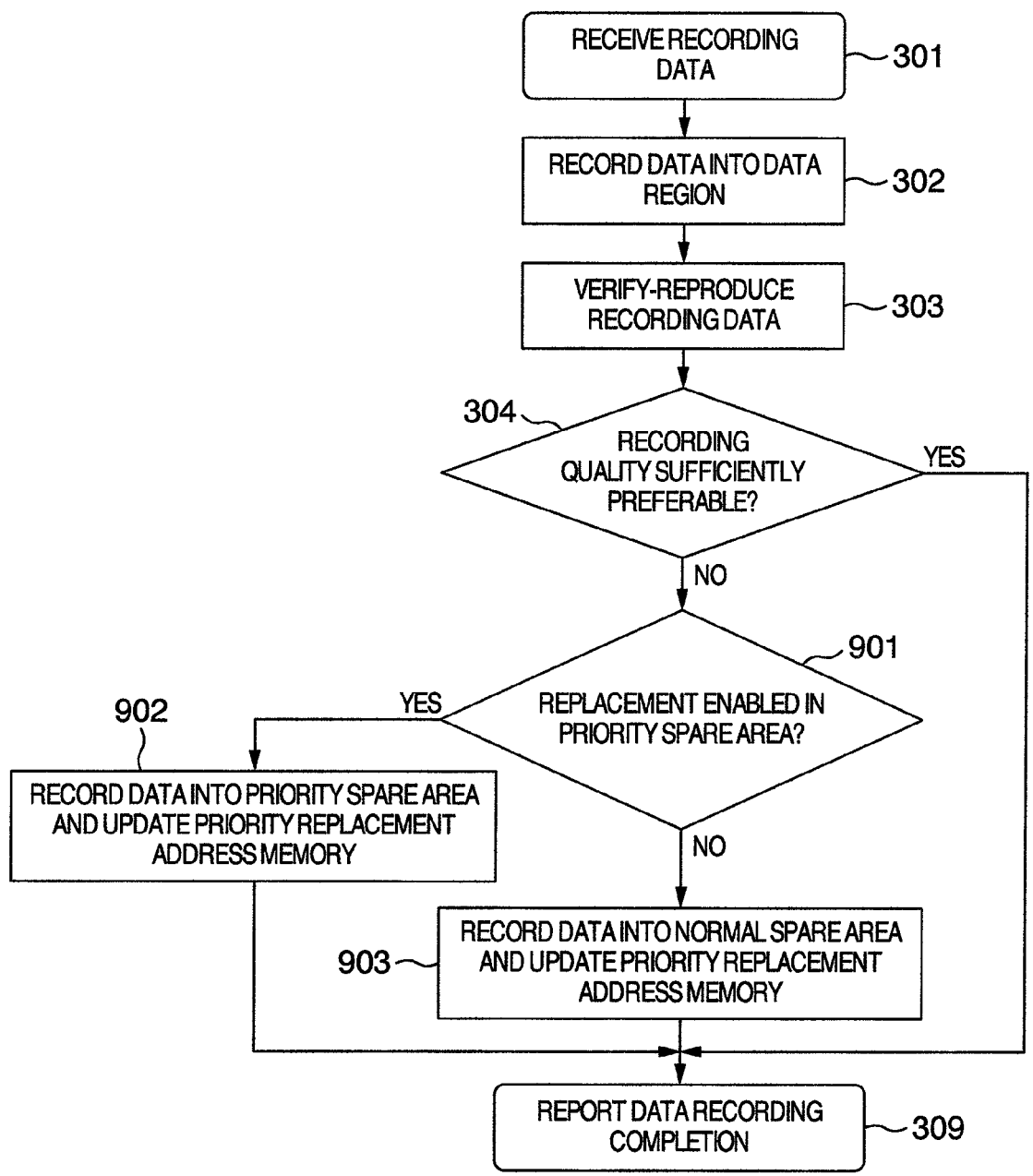

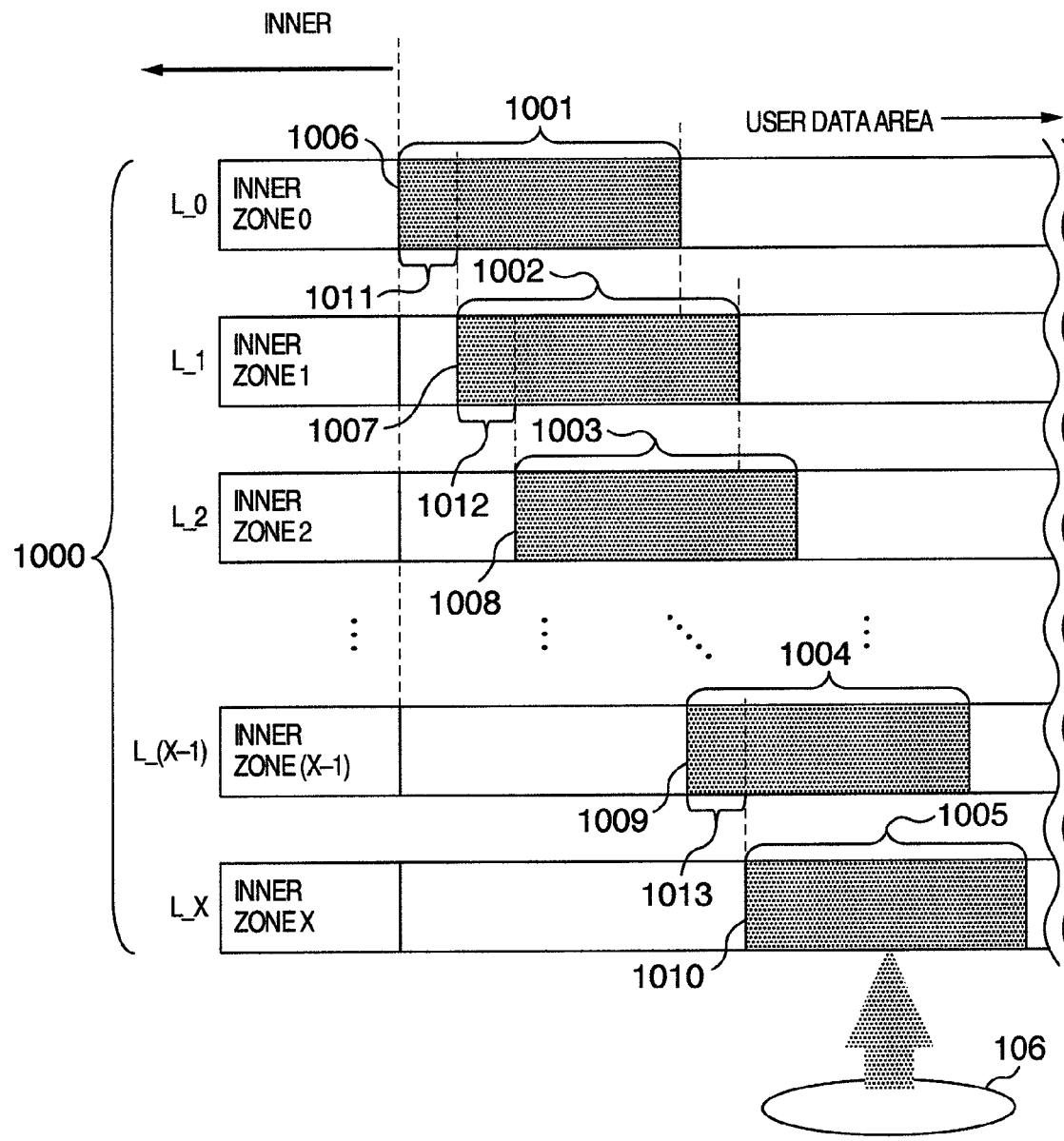

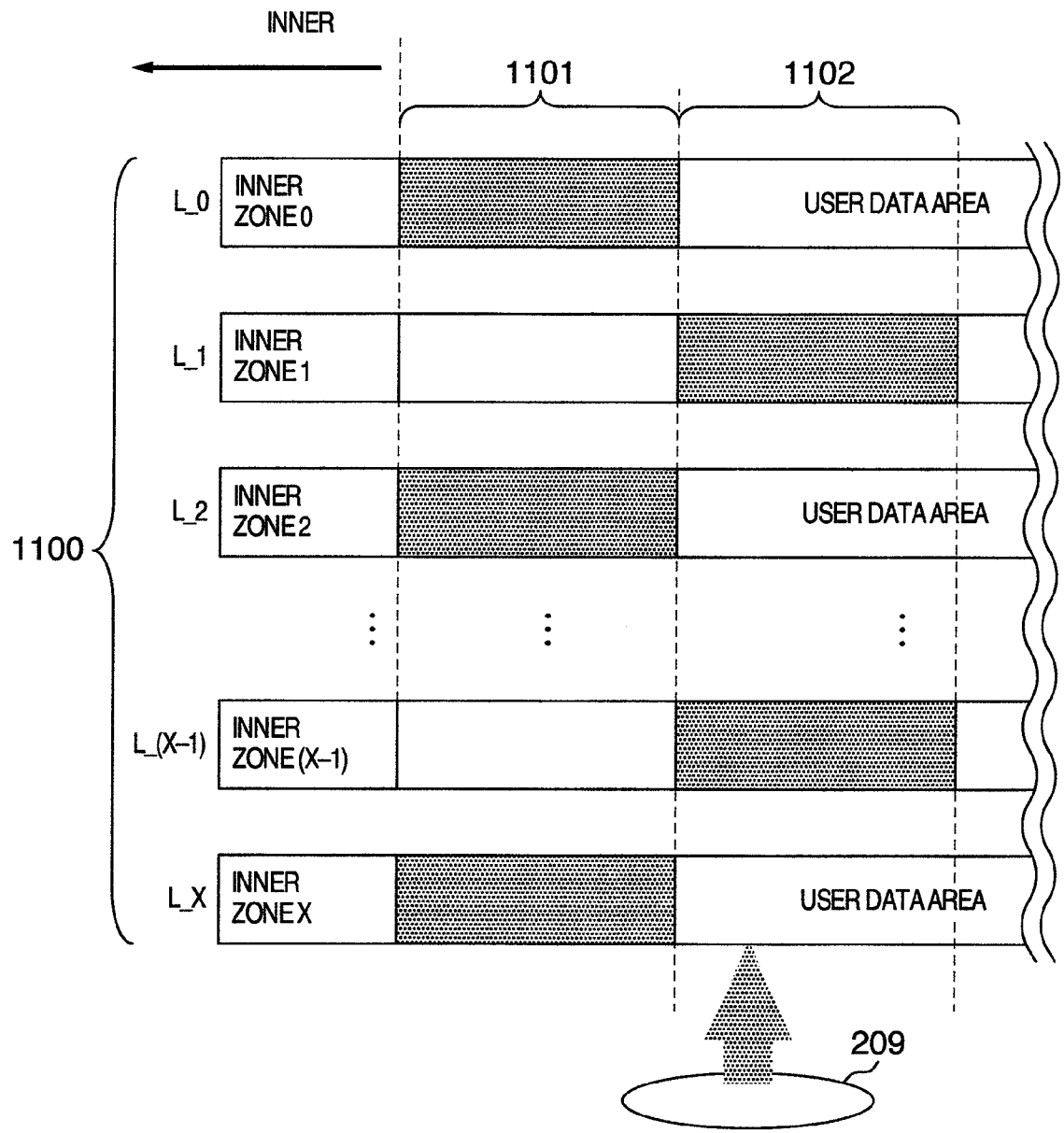

OPTICAL DISC APPARATUS, INFORMATION RECORDING METHOD AND INFORMATION RECORDING MEDIUM

INCORPORATION BY REFERENCE

The present application claims priority from Japanese application JP2007-260486 filed on Oct. 4, 2007, the content of which is hereby incorporated by reference into this application.

BACKGROUND OF THE INVENTION

The present invention relates to an replacement process upon a recording failure in an optical disc having a plurality of layers, an optical disc apparatus and an information recording method for recording information onto the optical disc.

For a DVD-RAM, a Blu-ray Disc (hereinafter, referred to as BD) and an HD DVD Disc (hereinafter, referred to as HD) which can perform recording, their specifications describe an replacement process to be performed upon a recording failure in a data region. After information is recorded and the recorded information is reproduced, the reproduction signal is evaluated. If the reproduced signal is defective, the "replacement process" is executed. That is, upon detection of a recording failure, the replacement process records the same information as the recorded information in a predetermined region on the disc. The predetermined region will be referred to as a spare area and the reproduction signal quality evaluation operation will be referred to as verify. The spare area is arranged in the inner circumference and the outer circumference of the DVD-RAM, the BD, and the HD. The replacement process and improvement of its reliability are detailed in JP-A-2006-85797 and JP-A-2006-185509.

On the other hand, recently, in order to increase the recording capacity, various types of recording discs have multiple layers. Currently, two-layer recording media are normalized in the DVD-R/RW, +RW, BD. Unlike the single-layer disc, the multi-layer disc should consider affect to the other layer upon recording. The multi-layer recording technique is detailed in JP-A-2000-311346.

Since recording into the spare area is for protection upon a recording failure in the data region, it is necessary to increase the reliability of the recording operation as compared to recording operation in the normal data region.

On the other hand, when the optical disc has multiple layers, the following occur as affects from other layers.

[1] Leak-in of a stray light signal is generated by irregularities of inter-layer distance in the disc plane.

[2] Leak-in of a stray light signal and an information signal is generated by a pseudo-focal point and focal point-shifted spot in the layer other than the recording or the reproduction layer.

[3] Recording irregularities are generated by a difference in transmittance in other recorded and unrecorded layers.

The leak-in of the stray light by [1] or [2] lowers the signal S/N, which in turn lowers the servo stability and lowers the reliability of the recording and reproduction operation. Furthermore, when the inter-layer thickness is made constant so as to reduce the multi-layered disc manufacturing cost, the leak-in of the pseudo-signal of [2] is generated. This causes fluctuations by leak-in of a servo error signal and lowering of the signal quality by leak-in of a reproduction signal. In such a condition, an error is caused in the reproduction quality evaluation of a recording signal upon verify and it becomes impossible to guarantee a correct verify operation. As for [3], since the recording film state is different in the mark and the space portion of the data recording portion, the transmittance differs and the recording may not be performed uniformly. These affects become greater as the number of layers in the disc increases and the inter-layer gap decreases.

The aforementioned JP-A-2006-85797 and JP-A-2006-185509 disclose a technique of data rearrangement and modification of a recording position so as to improve the reliability of the replacement process but do not consider the aforementioned problems in the multi-layer disc. Moreover, as a method for improving the reliability among the aforementioned objects, JP-A-2000-311346 discloses a correction method for recording power learning in the recorded and unrecorded portions of the multi-layer disc. According to the method, it is possible to improve the reliability of the recording learning, or recording parameter adjusting, in the multi-layer disc. However, no consideration is taken on the improvement of recording reliability for the recording operation, especially in the recording in the spare area.

SUMMARY OF THE INVENTION

It is therefore an object of the present invention to provide an optical disc apparatus, a recording method, and a recording medium which can set an spare area appropriate for a multi-layer disc.

The aforementioned object can be achieved by employing an appropriate arrangement of the spare area.

According to the present invention, it is possible to provide an optical disc apparatus, a recording method, and a recording medium which can set an spare area appropriate for a multi-layer disc.

BRIEF DESCRIPTION OF THE DRAWINGS

FIG. 9 is a flowchart showing a recording process in the optical disc apparatus according to the third embodiment.

FIG. 10 shows arrangement of recording regions in the inner circumferential portion of the optical disc according to the fourth embodiment.

FIG. 11 shows arrangement of recording regions in the inner circumferential portion of the optical disc according to the fifth embodiment.

DETAILED DESCRIPTION OF THE EMBODIMENTS

Description will now be directed to embodiments of the present invention.

Embodiment 1

Figure 1:
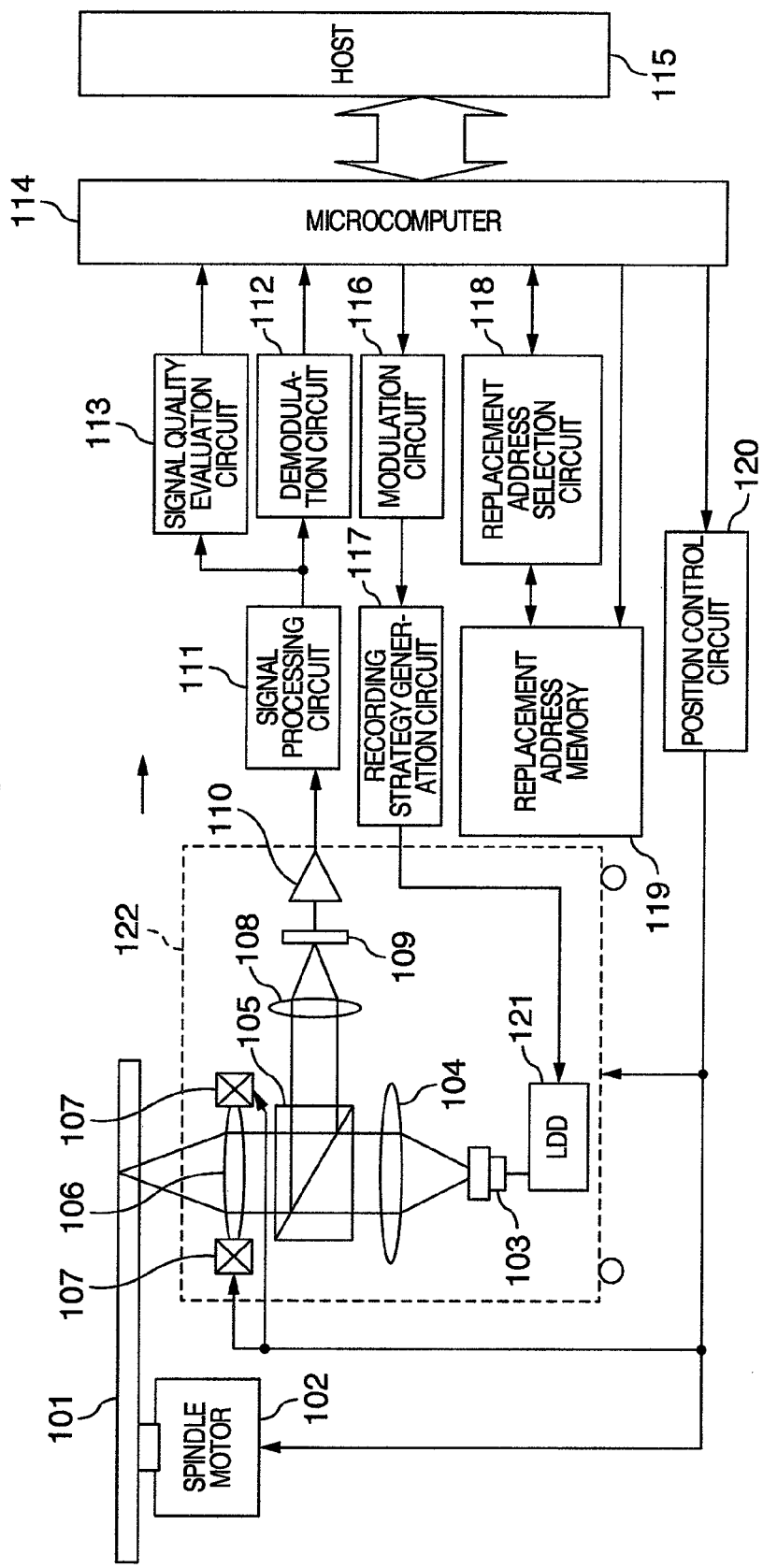
FIG. 1 is a block diagram showing a configuration of an optical disc apparatus according to a first embodiment of the present invention.

FIG. 1 is a block diagram showing a configuration of an optical disc apparatus according to a first embodiment of the present invention.

During data recording, recording data transmitted from a host 115 is received by a microcomputer in FIG. 1. The microcomputer 114 transmits the recording position where the recording data is recorded on the disc, i.e., the address information, to a position control circuit 120. According to the address information received, the position control circuit 120 performs rpm control of a spindle motor 102, a radial position control of a pickup 122, and control of an actuator 107.

Simultaneously with this, the recording data received is transmitted to a modulation circuit 116. The modulation circuit 116 modulates recording information by a predetermined modulation method corresponding to the disc 101 and sends the modulated information to a recording strategy generation circuit 117 which generates a laser pulse for recording. According to the recording strategy generated, the recording strategy generation circuit 117 drives a laser 103 via a laser driver 121. Recording laser light emitted from the laser 103 is focused via collimate lens 104, a beam splitter 105, and an objective lens 106 onto an information recording plane so as to perform an information recording by marks and spaces.

During data reproduction, the laser light is emitted from the laser 103 with a reproduction power and focused onto the disc 101 via the same route as in the recording. The reflected light reflected from the disc 101 is branched by the beam splitter 105, collected by a collective lens 108, and is converted into an electric signal (hereinafter, simply referred as a signal) by a photoelectric conversion element 109. The obtained signal is introduced to an I/V conversion circuit and a signal processing circuit 111 and then demodulated by a demodulation circuit 112 and sent via the microcomputer 114 to the host 115.

Moreover, when it is necessary to evaluate the recording signal quality such as during verify, the output of the signal processing circuit 111 is inputted to a signal quality evaluation circuit 113. The signal quality evaluation circuit 113 evaluates a reproduction signal by a predetermined evaluation method and reports to the microcomputer 114 whether an replacement process is required.

When the replacement process has occurred, an replacement address selection circuit 118 references an replacement address memory 119 and decides an replacement address. The replacement address memory 119 contains the recording address management information in the spare area which has been read out from the disc. When the replacement process has completed by, address management information such as the data region address of the replaced source and the data recording address in the spare area are additionally written into the address memory or updated and the memory information is additionally written as the alternative recording management information into the disc when the recording operation is complete or when the disc is taken out from the optical disc apparatus.

Figure 2:
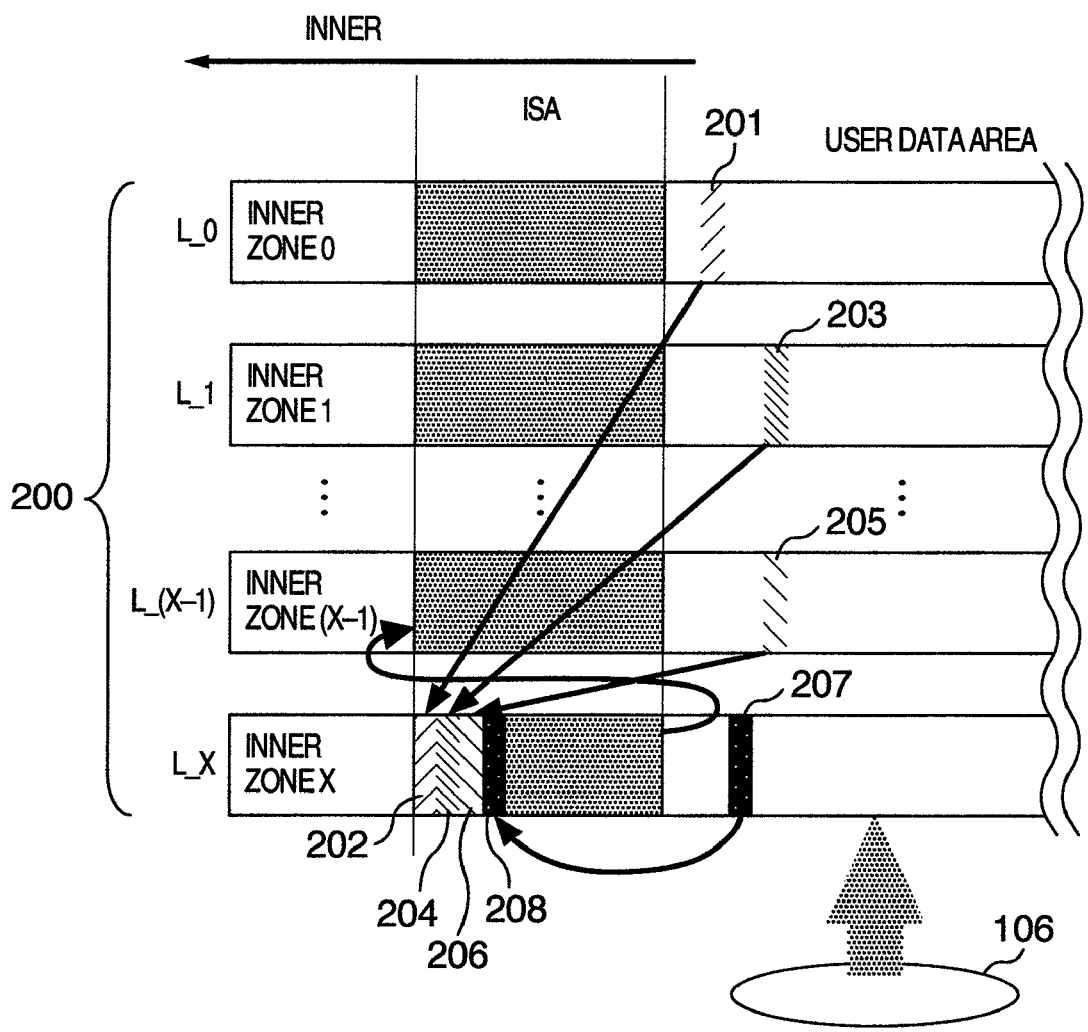
FIG. 2 shows arrangement of recording regions in the inner circumferential portion of the optical disc according to the first embodiment.

FIG. 2 shows arrangement of recording regions of an inner circumferential portion of an optical disc formed by (X+1) layers of layer number L_0 to L_X. Each layer of the disc has an Inner Zone, an inner spare area (ISA), a data recording region, and the like. In this disc, data is successively recorded from the inner circumference to the outer circumference of the layer L0 and the recording proceeds from the layer L_0, the layer L_1, to the layer L_2. Moreover, it is assumed that a laser is applied from the downside via the objective lens 106.

It should be noted that hereinafter, in the disc formed by the plurality of layers, the layer nearer to the objective lens will be referred to as a forward layer and the layer far from the objective lens will be referred to a backward lens.

Hereinafter, explanation will be given on the replacement process in this embodiment.

Assume that an replacement process is generated in a portion 201 in FIG. 2 while data recording is performed in the data region of the layer L_0. Here, in the optical disc apparatus shown in FIG. 1, the alternative recording position selection circuit 118 checks the contents of the address memory 119 and the data is recorded in the spare area 202 of the layer most forward spare area where alternative recording can be performed, i.e., the layer L_X in this embodiment. Hereinafter, when an replacement process is generated in the portions 203, 205, 207 in the figure, data is continuously recorded in the spare areas of the layer L_X such as 204, 206, and 208. Moreover, when all the spare areas of the layer L_X are full of recorded data, it is detected by the alternative recording position circuit of the optical disc apparatus and data is recorded in the spare area of the layer L_(X−1) which is the next forward layer after the layer L_X. Thus, data recording is performed by searching an spare area successively from the most forward layer.

Figure 3:
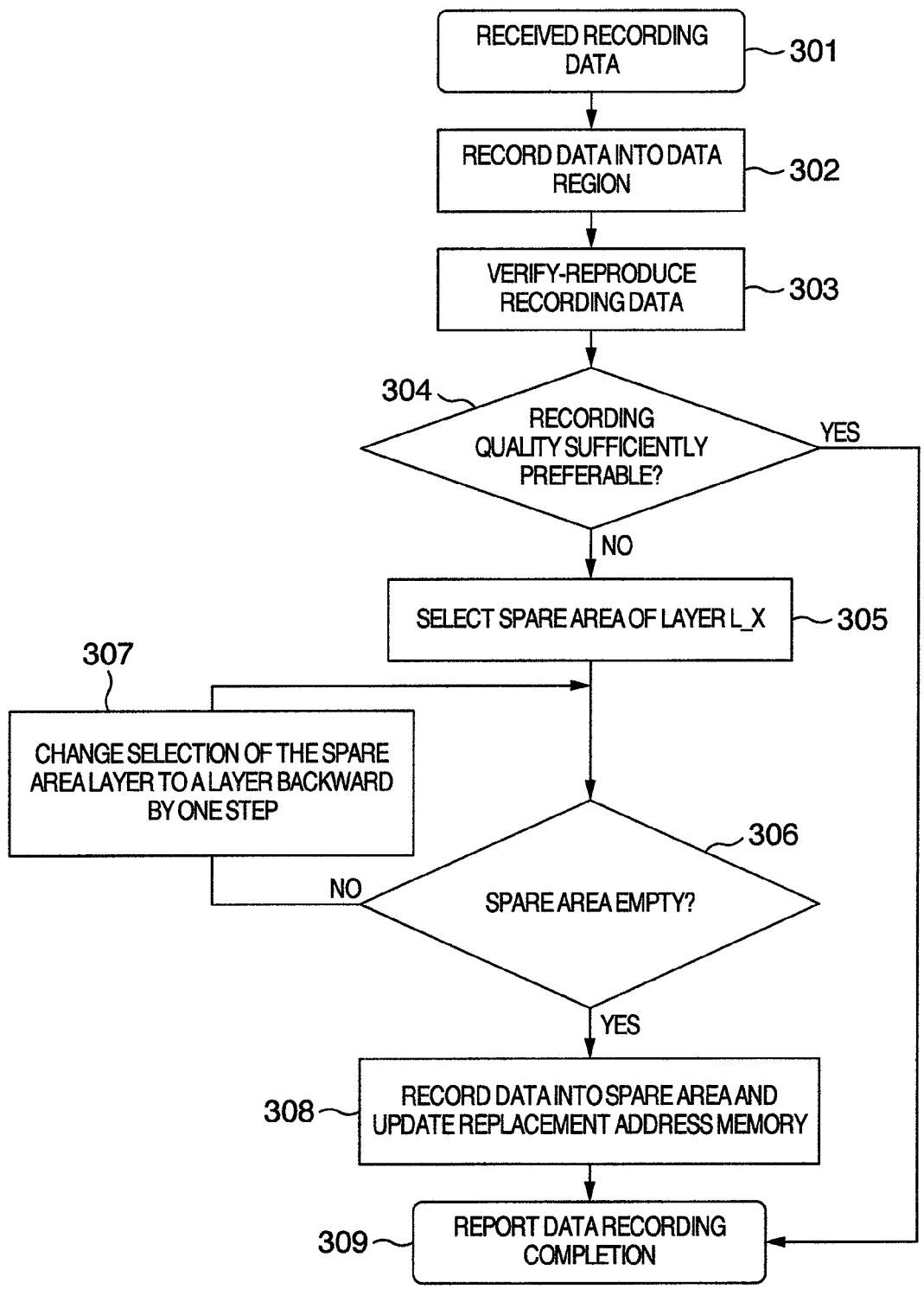
FIG. 3 is a flowchart showing a recording process in the optical disc apparatus according to the first embodiment.

FIG. 3 is a flowchart showing the data recording process in the present embodiment thus far described. After the drive has received recording data from a host such as a PC (301), the data is recorded in a predetermined address within a data region of the disc (302). Next, verify reproduction of the recording data is performed (303) and the recording quality is checked (304). When the recording quality is sufficiently preferable with respect to a predetermined quality, no replacement process is performed and completion of the data recording is reported to the host, thereby terminating the process (309).

When the step 304 has judged that the recording quality is defective, the spare area in the L_X of FIG. 2 is selected (305) and check is performed whether the alternative recording can be performed (306). If the spare area of the layer L_X has a recording-enabled area, the data is recorded at a predetermined address within the spare area in the layer L_X and the replacement address memory is updated. The completion of data recording is reported to the host, thereby terminating the process (309). If the spare area of the layer L_X has no recording-enabled area, the data is recorded in a layer backward by one, i.e., the layer L_(X_1). In the same way as the layer L_X, check is performed whether the spare area has a recording-enabled area and the alternative recording is performed.

In this embodiment, the replacement process is performed by successively recording data starting in the spare area of the most forward layer and then in the spare area of the backward layer. Thus, when recording data in the spare area and when reproducing data from the spare area, it is possible to minimize the number of layers through which the laser light passes when going from the objective lens to the recording layer where the data is recorded. This can minimize the following:

[1] generation of recording or reproduction failure by servo error by leak-in of a stray light from the transmission layer,

[2] degradation of the recording or reproduction signal quality by leak-in of an information signal recorded on the transmission layer, and

[3] generation of a recording failure by a transmittance difference between the recorded and the unrecorded portion in the transmission layer.

Thus, it is possible to realize stable data recording in the alternative recording layer.

It should be noted that in the multi-layer disc, the aforementioned spare areas need not be arranged in all the layers. For example, the spare areas in all the layers may be arranged only in one layer, i.e., concentrated in only the layer L_X of FIG. 2, for example. When the spare areas are arranged only in the layer L_X, it is possible to obtain the effect of the aforementioned first embodiment in all the replacement process.

Embodiment 2

Next, explanation will be given on a second embodiment of the present invention.

Figure 5:
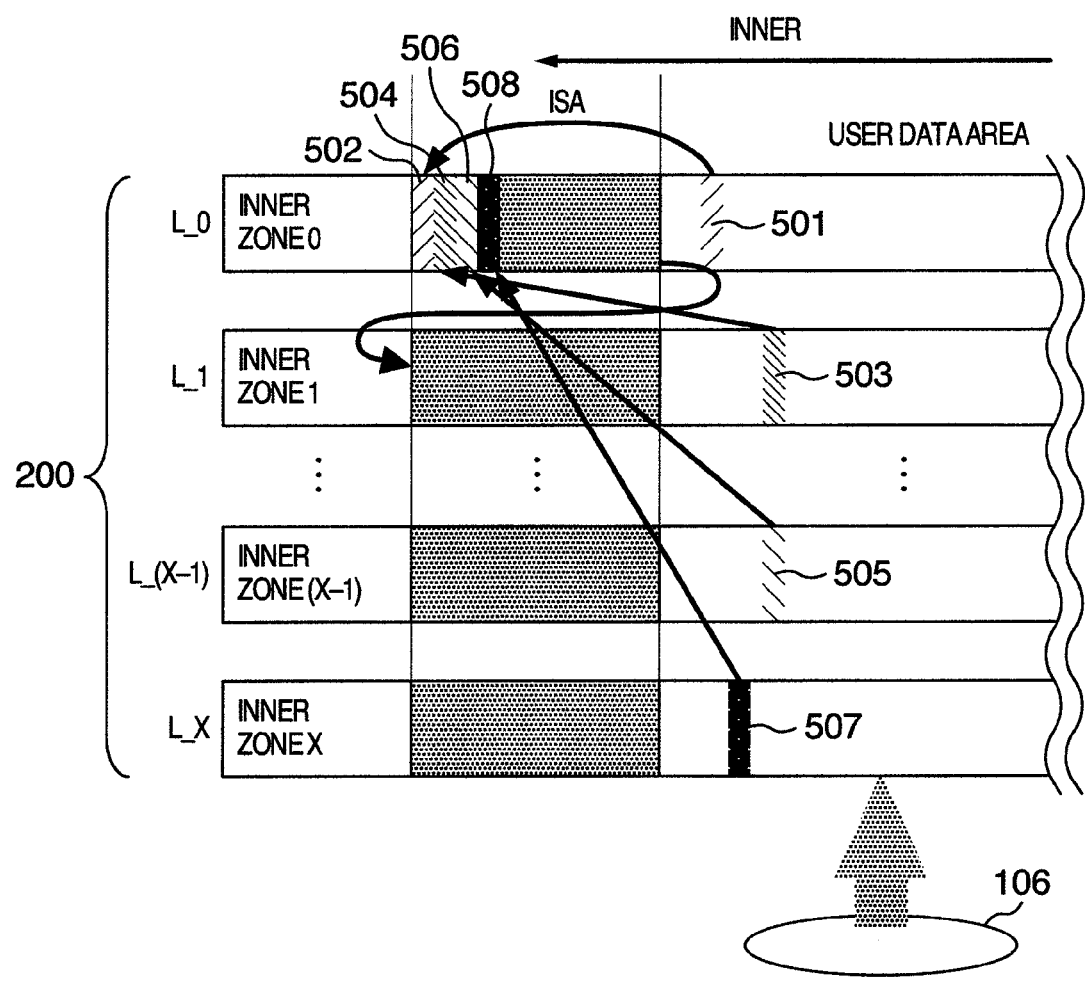
FIG. 5 shows arrangement of recording regions in the inner circumferential portion of the optical disc according to the second embodiment.

In this embodiment, the optical disc apparatus and the disc have the same configurations as in the first embodiment but the spare area selection upon an replacement process is different. This part will be explained with reference to FIG. 5.

In the same way as in the first embodiment, the optical disc 200 has (X+1) layers from layer L_0 to L_X. Assume that while data is recorded in the data region of the layer L_0, an replacement process occurs in the portion 501 of FIG. 5. Here, the data is recorded in the most backward spare area where alternative recording can be performed in the case of the alternative recording position selection circuit 118 of the optical disc apparatus shown in FIG. 1 while the data is recorded in the spare area 502 of the layer L_0 in this embodiment. When an replacement process occurs in the portions 503, 505, 507 of FIG. 5, the data is recorded continuously in the spare areas of the layer L_0 like in 504, 506, 508. Moreover, when all the spare areas of the layer L_0 are all filled with data, the alternative recording position selection circuit of the optical disc apparatus detects that and selects the spare area of the layer L_1 as the next backward layer after the layer L_0. Thus, the data recording is performed by searching for the spare area where data recording can be performed, starting at the most backward layer.

Figure 6:
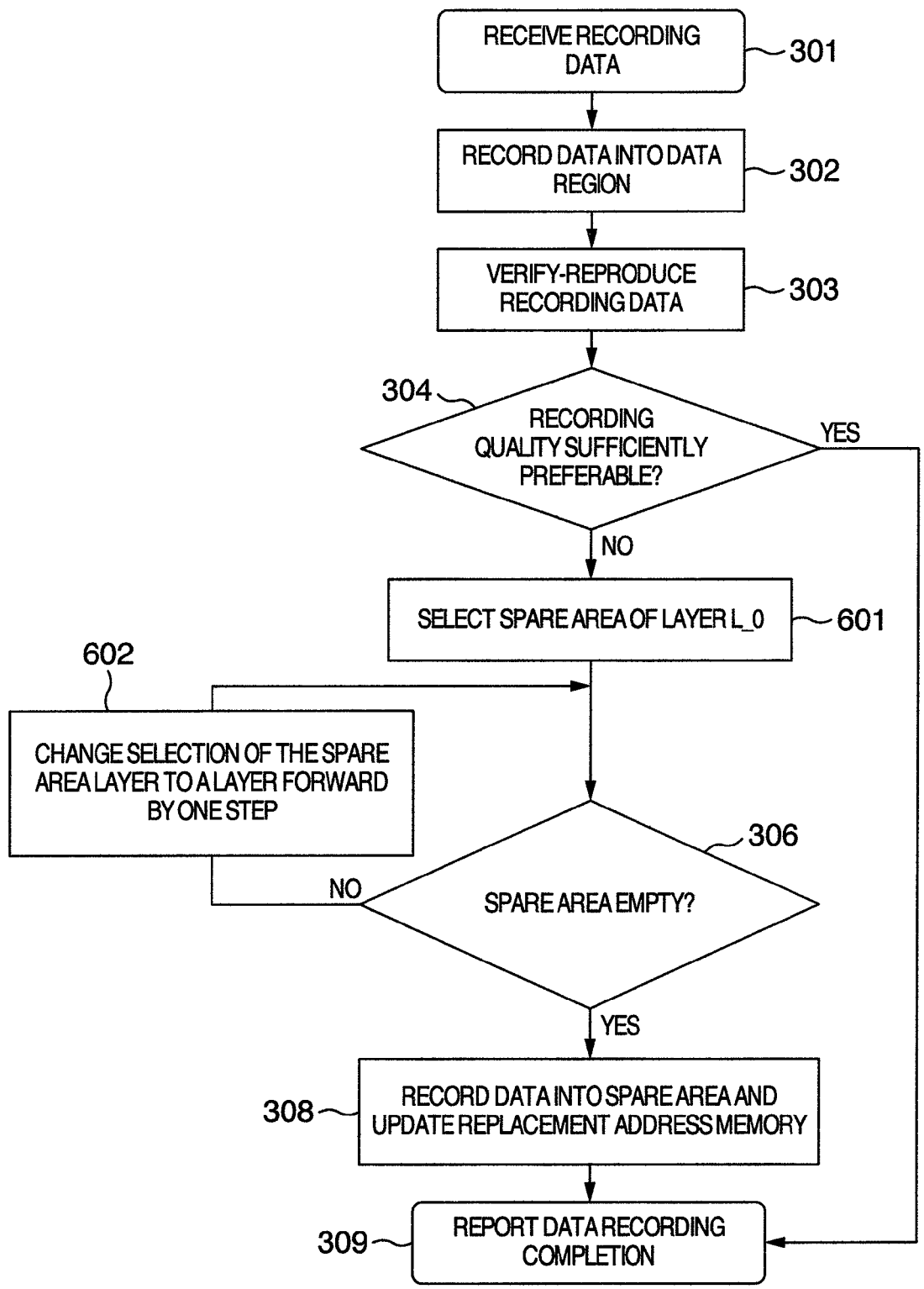
FIG. 6 is a flowchart showing a recording process in the optical disc apparatus according to the second embodiment.

FIG. 6 is a flowchart of the data recording process operation in the aforementioned present embodiment. The same processes in FIG. 6 as in FIG. 3 are indicated by the same numerals and their explanations are omitted. What is different from FIG. 3 is that after it is judged that an replacement process is required in the verify reproduction of the recorded data, the spare area of the layer L_0 is firstly selected (601). Moreover, after it is judged that the spare area of the selected layer has a region where recording can be performed and it is decided that the spare area has no empty area, an spare area which is forward by one with respect to the objective lens, i.e., the spare area of the layer L_1 in this embodiment is selected (602).

In this embodiment, upon an replacement process, data is successively recorded starting at the spare area of the backward layer and then of the forward layer. Thus, when recording data in the spare areas, it is possible to make all the layers through which the laser light pass, i.e., from the objective lens to the recording layer where the data has been recorded, to be in the unrecorded state.

This can minimize the following:

[1] leak-in of the information signal from other layer by the pseudo-focal point and the focal point shift spot in the layer other than the recording or the reproduction layer, and

[2] generation of a recording failure caused by a transmittance difference between the recorded and the unrecorded portion of the transmittance layer.

Furthermore, in this embodiment, the spare areas are successively used one after another from the layer farthest from the objective lens to the layer nearest to the objective lens, thereby stabilizing the effect of the data recording in all the spare area recordings.

It should be noted that like in the first embodiment, in this embodiment also, there is no need of arranging the spare area in all the layers.

Embodiment 3

Non-Overlapped Spare Area Address Space Arrangement

Next, explanation will be given on a third embodiment of the present invention.

Figure 7:
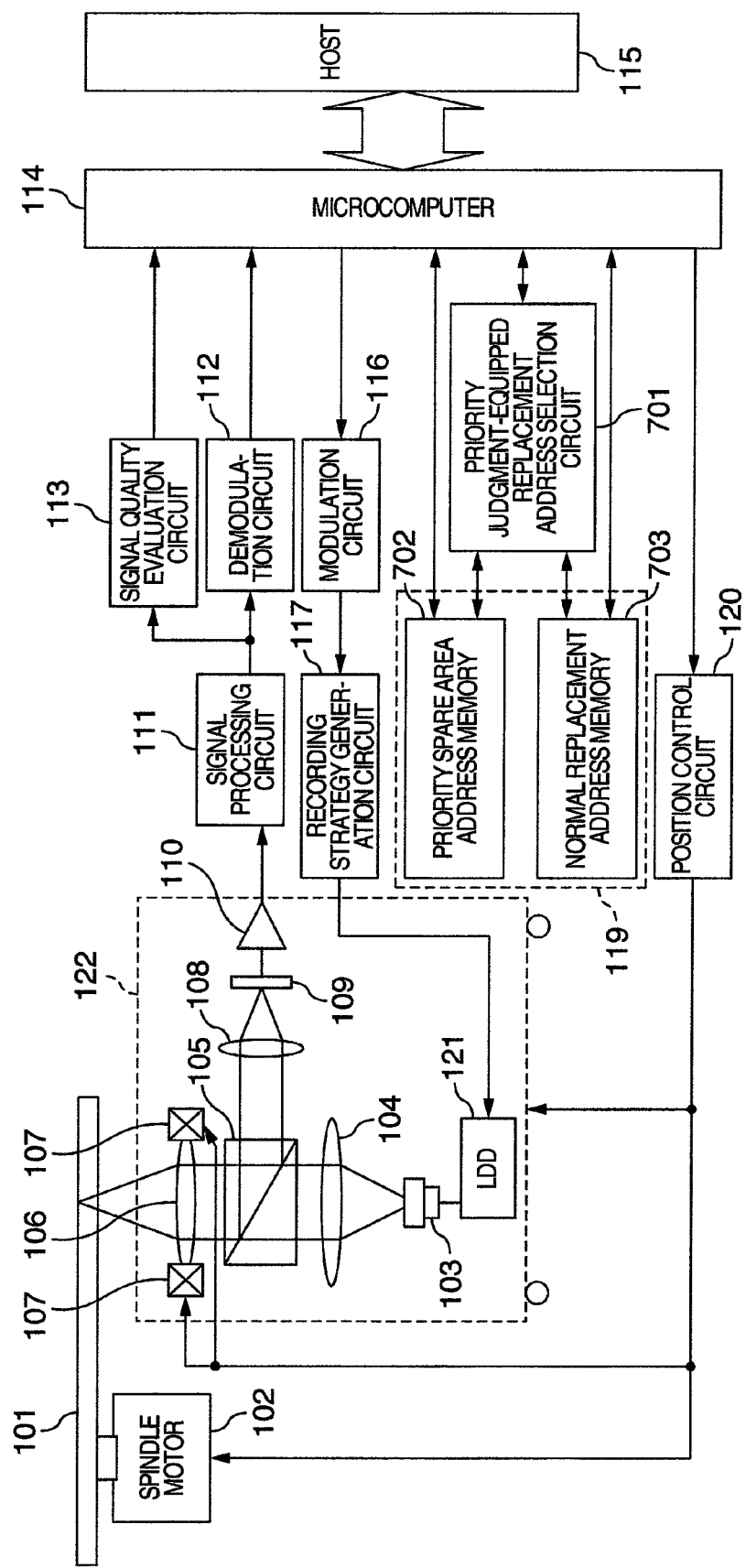
FIG. 7 is a block diagram showing a configuration of an optical disc apparatus according to a third embodiment of the present invention.

FIG. 7 is a block diagram showing a configuration of an optical disc apparatus according to the third embodiment. The same components in FIG. 7 having the same functions as in FIG. 1 are denoted by the same numerals and their explanations are omitted. The difference between FIG. 7 and FIG. 1 are as follows.

1. The replacement address selection circuit 118 which performs a recording address selection in the spare area in FIG. 1 is replaced by a priority judgment-equipped replacement address selection circuit 701 which performs the replacement address selection for each of the priority spare area and the other region with different priorities in FIG. 7.

2. The spare area address memory 119 which holds recording address managing information on the spare area in FIG. 1 is divided into a priority spare area address memory 702 and a normal spare area address memory 703. The priority spare area address memory holds recording address managing information on the priority spare area which will be detailed later. The normal spare area address memory holds recording address managing information on the normal spare area other than the aforementioned region.

Figure 8:
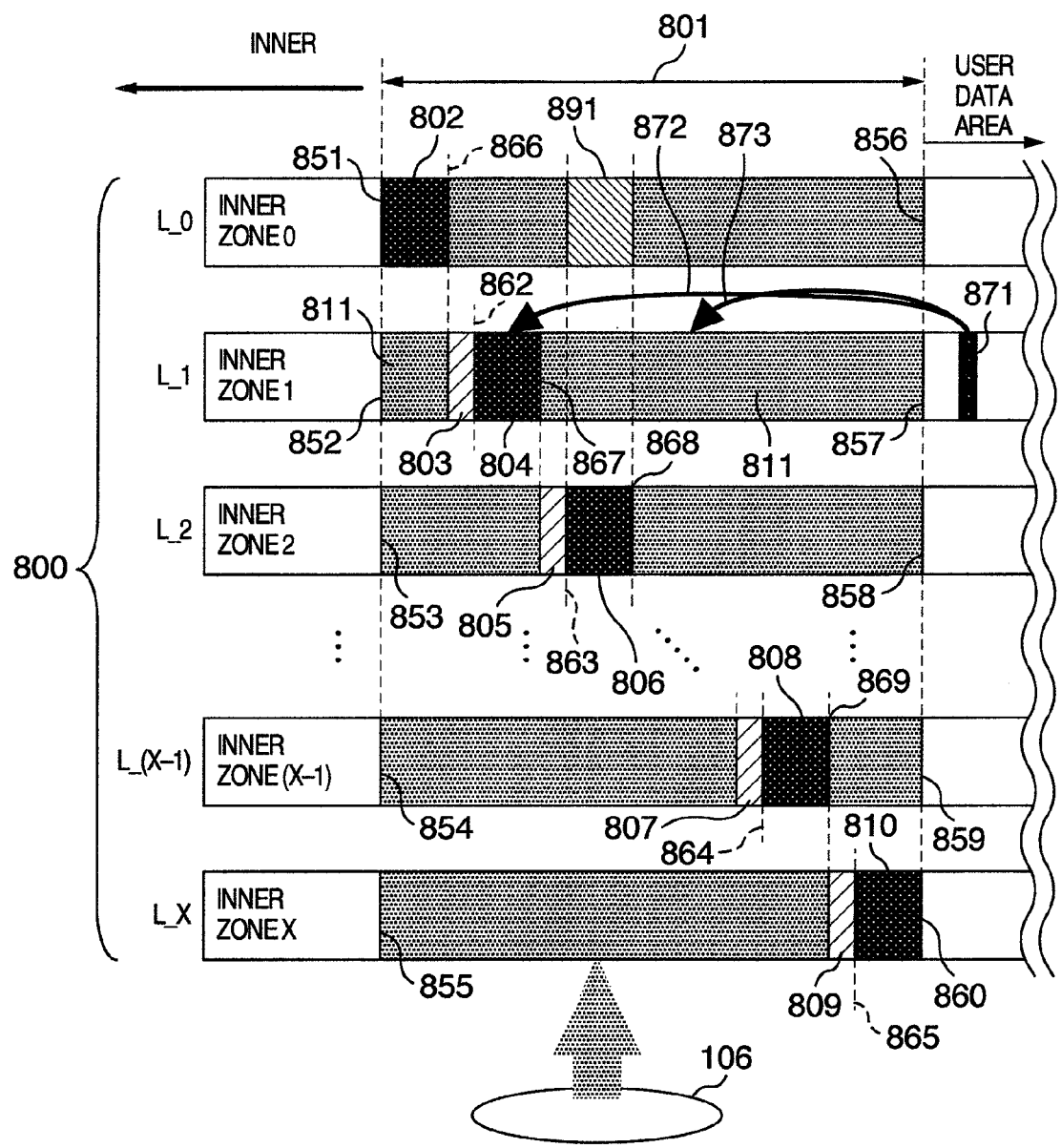
FIG. 8 shows arrangement of recording regions in the inner circumferential portion of the optical disc according to the third embodiment.

FIG. 8 shows data recording regions of the inner circumferential portion of the optical disc formed by the number (X+1) of layers: layer L_0 to L_X. It is assumed that upon disc initial formatting, the portion 801 of each layer is specified as the spare area. The portions 802, 804, 806, 808, 810 in FIG. 8 are priority spare areas. It is assumed that the address space in the disc is specified in advance by the specification. As shown in FIG. 8, these regions are arranged so that their radial positions are not overlapped with the priority spare areas of the other layers. Moreover, as has been described above, the priority spare areas are specified as address spaces on the disc. Moreover, in the recording type optical disc, the address information is often embedded on the disc substrate portion by wobbles and pits. However, in the case of the multi-layer disc, the layer structure may be generated by bonding substrates. In this case, the address positions may be shifted between the layers according to the bonding accuracy. To solve this problem, for example, a buffer region shown by 803 is arranged for the priority spare area 802 of the layer L_0 and the priority spare area 804 of the layer L_1. This can prevent generation of radial position overlap of the priority spare areas between the layers due to a bonding position shift.

The buffer regions are indicated by 803, 805, 807, 809 in FIG. 8. No data is recorded in the buffer regions.

Referring to FIG. 7 and FIG. 8, explanation will be given on the operations of the optical disc apparatus in the data recording of the present embodiment. The sequence of the operations up to the step of performing the replacement process is identical to the one in the first embodiment and its explanation is omitted here.

In the optical disc of FIG. 8, assume that an replacement process is generated during data recording in the data region 871 of the layer L_1. Here, the priority judgment-equipped replacement address selection circuit 701 firstly checks the priority spare area address memory 702. The priority spare area address memory contains address managing information on the priority spare areas of the respective layers. In the case of FIG. 8, the address managing information on the priority spare areas of the portions 802, 804, 806, 808 is contained. In this example, the address managing information on the region 804 in the same layer as the data recording region 871 is checked. If the alternative recording can be performed in the region 804, data is recorded, as shown by 872 in FIG. 8, in the region 804 according to the address arrangement rule inside the region 804. When recording is executed, the recording address is additionally registered in the priority spare area address memory 702.

On the other hand, if it is judged that alternative recording cannot be performed in the region 804 because of the reason such that all addresses within the region are recorded, the priority judgment-equipped spare area address selection circuit 701 subsequently checks the normal spare area address memory 703. The normal spare area address memory is an spare area portion other than the aforementioned priority spare area among the spare areas specified upon disc initial formatting. When performing the alternative recording in the normal spare area, data is recorded in the region 811 in the same layer as the data recording region 871, as shown by 873 in FIG. 8, according to the address arrangement rule inside the normal spare area. When the recording is executed, the recording address is additionally registered in the normal spare area address memory 703.

FIG. 9 is a flowchart showing the aforementioned data recording process in the present embodiment. The processes up to the step of recording quality judgment shown by 304 in FIG. 9 are identical to the processes of the first embodiment shown in FIG. 3 and their explanations are omitted here. If it is judged that the recording quality judgment process requires an replacement process, firstly check is made to determine whether the alternative recording can be performed in the priority spare area (901). If YES, data requiring the replacement process is recorded in the priority spare area and the priority replacement address memory is updated (902). The data recording completion is reported to the host, thereby terminating the process (309). If NO, the data requiring the replacement process is recorded in the normal spare area and the normal replacement address memory is updated (903). The data recording completion is reported to the host, thereby terminating the process (309).

In this embodiment, data is recorded with a higher priority, in the priority spare area having no overlap of radial positions between the layers. Thus, when the alternative recording data amount is small, the layers through which the laser light passes from the objective lens to the recording layer where the data is recorded may be made in an unrecorded state. This, in turn, minimizes:

1. leak-in of an information signal from the other layers caused by a pseudo-focal point and a focal point shift spot in the layer other than recording or the reproduction layer, and 2. generation of a recording failure due to the transmittance difference between the recorded and the unrecorded portions of the transmitting layers.

Thus, it is possible to realize stable data recording in the spare area.

It should be noted that in the aforementioned case, no specification is performed for address selection upon recording into the normal spare area.

However, for example, when recording into the priority spare area 802 of FIG. 8 is disabled, it is possible to perform recording at a radial position different from the radial position of the priority spare area of the adjacent layer such as the region 891 of the normal spare area in FIG. 8 so as to reduce the leak-in of the information signal from other layer by the pseudo-focal point and the focal point shift spot in the layer other than recording and reproduction layers.

Furthermore, in the aforementioned case, in order to obtain an effect of reducing the leak-in of a stray light signal or an information signal caused by irregularities of the pseudo-focal point and the inter-layer distance, it is also possible to perform recording in a normal spare area at a radial position different from the priority spare area of the layer apart from N layers (N is an arbitrary number) instead of the adjacent layer.

Moreover, in the example of this embodiment, the disc technical standard is specified in advance. However, the priority spare area need not be specified by the disc technical standard if the correspondence between the alternative source address information (data region address) and the alternative destination address information (spare area address) of the replacement processing is registered in the alternative recording managing information.

Embodiment 4

Arrangement Upon Formatting of Embodiment 3

Next, explanation will be given on a fourth embodiment of the present invention.

FIG. 10 shows arrangement of the spare areas of the inner circumference side in an optical disc 1000 of the present embodiment. The colored portions 1001 to 1005 in FIG. 10 represent spare areas. As has been described above, the spare areas are specified by an application or the like for the regions specified by the disc technical standard upon execution of disc initialization. In this embodiment, the spare areas are arranged so that the radial positions of the heads of the spare areas are shifted by a predetermined distance. This relationship can be expressed as follows.

$$R\_AltS(N+1) < R\_AltS(N) + RA(N) \quad (2)$$

In Expression (2), R_AltS(N) represents the start radial position of the spare area of the layer N while RA(N) represents the shift amount of the radial position in the layer N. RA(N) corresponds to 1011, 1012, 1013 in FIG. 10. These may be changed for each of the layers.

By arranging the spare areas in this way, when recording data in the portions 1011, 1012, 1013 of FIG. 10, it is possible to obtain the layers through which the laser light pass from the objective lens to the recording layer where the data is recorded, in the unrecorded state. Thus, it is possible to obtain the same effect as the aforementioned third embodiment.

Furthermore, in the spare area arrangement of this embodiment, data recording is started at the head address of each of the spare areas and it is possible to obtain the same effect as the third embodiment without requiring the priority spare area address memory shown in the third embodiment. This simplifies the internal configuration of the optical disc drive and the process.

Moreover, in this embodiment, the relationship between the spare area start radial positions R_AltS(N) of the respective layers is shown. The same relationship can also be applied to the end radial positions of the respective spare areas.

Embodiment 5

Inter-Layer Checker-Patterned Arrangement of Spare Areas

Next, explanation will be given on a fifth embodiment of the present invention.

FIG. 11 shows arrangement of the spare areas of the inner circumference in the optical disc 1100 of the present embodiment. Among the aforementioned affects from other layers, the following are especially large from the adjacent layers:

1. generation of leak-in of a stray light signal by irregularities of the inter-layer distance of the respective layers in the disc plane, and
2. generation of leak-in of an information signal from other layers by a pseudo-focal point and a focal point shift in the layer other than the recording and reproduction layers.

For this, in this embodiment, the radial position of the spare areas is varied between the even-number layers and the odd-number layers. For example, in the layers L_2N (N=0, 2, ..., X/2), the spare area is arranged at the inner zone end radial position while in the layers L_(2N+1) (N=0, 2, ..., (X−2)/2), the spare area is arranged from the radial position where the spare area ends. It should be noted that the actual spare area is managed by the address on the disc. However, as has been explained in the third embodiment, the inter-layer address position is generated. For this, it is possible, for example, to set a buffer region shown in the third embodiment before the spare area start address of the layer L_(2N+1). However, this complicates the example and its explanation is omitted.

By using the arrangement of the spare areas in this embodiment, it is possible to reduce:

1. generation of a recording failure by the servo signal deflection by leak-in of recording data from the upper or the lower layer due to the in-plane irregularities of the layer interval, and
2. affects of reproduction signal degradation by leak-in of the recording data from the upper or the lower layer due to the in-plane irregularities of the layer interval.

It should be noted that in this embodiment, every other spare area is arranged at the same radial position. However, according to the affect range of the inter-layer interference of the recording data, it is also possible to arrange every N-th (N is an arbitrary number) spare area at the same radial position. The number is not limited to the present embodiment.

Embodiment 6

Inter-Layer Checker-Patterned Arrangement of Spare Areas

Next, explanation will be given on a sixth embodiment of the present invention.

Figure 4:
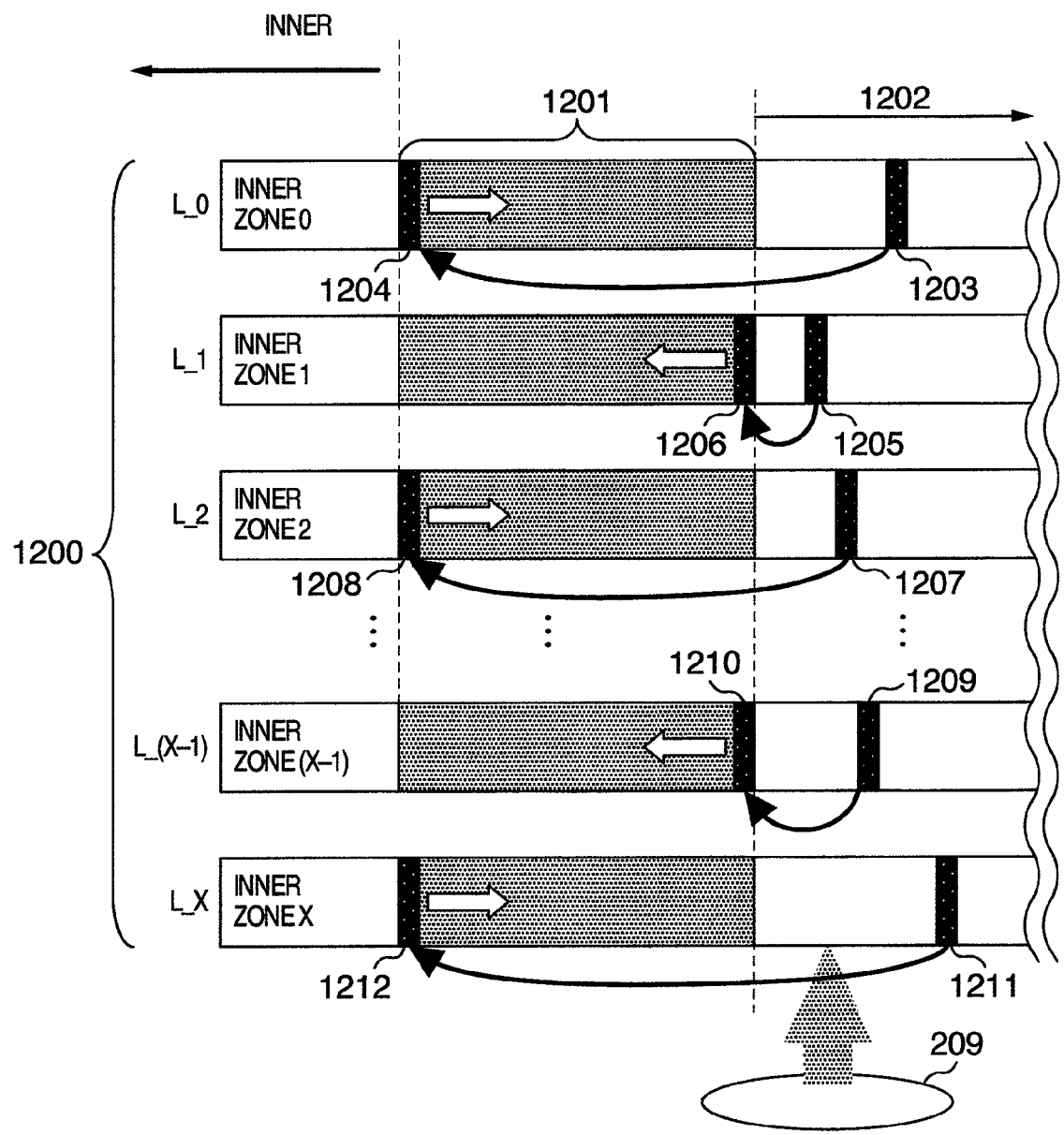
FIG. 4 shows arrangement of recording regions in the inner circumferential portion of the optical disc according to the sixth embodiment.

FIG. 4 shows an alternative recording operation in the inner circumference of the optical disc 1200 in the present embodiment. In FIG. 4, 1201 represents spare areas and 1202 represents data recording regions. In this embodiment, in order to solve the same problem as in the fifth embodiment, the use start positions of the even-number and the odd-number spare areas arranged continuously on the same radial positions are changed in each layer. For example, as shown in FIG. 4, if an replacement process is generated at 1203 while recording data in the layer L_0, alternative recording is performed in the region 1204 at the innermost circumferential position of the spare area 1201. Hereinafter, in the layer L_0, the spare area is used successively starting at the inner circumferential side of the spare area 1201. Next, when an replacement process is generated while recording data in the layer L_1, the alternative recording is performed in the outermost circumferential side of the spare area 1201. Hereinafter, in the layer L_1, the spare area is successively used starting at the outer circumferential side of the spare area 1201. Thus, in this embodiment, in the spare areas of the even numbers, recording is started at the inner circumferential side while in the spare areas of the odd numbers, recording is started at the outer circumferential side. Thus, it is possible to obtain the same effect as the aforementioned fifth embodiment until the radial position of each layer where alternative recording is executed is superimposed by the radial positions used by the spare areas of the upper and the lower layers.

It should be noted that in the first to the sixth embodiment of the present invention, it is possible to obtain the same effect regardless of the recording order of the layers when continuously recording data on a multi-layer disc and when recording data at random on the respective layers.

Moreover, in the first to the sixth embodiment of the present invention, the examples given show the alternation process at the inner circumferential side of the disc. However, it is possible to obtain the same effects of the aforementioned embodiments in the disc having spare areas at the outer circumferential side by performing the similar arrangement as in the embodiments of the present invention.

Moreover, for the recording position in the spare area in the first to the fifth embodiment, the example given shows continuous data recording from the inner circumferential side of the spare area. However, it is also possible to use various arrangements such as the ascending order or the descending order of the addresses or an arbitrary address order. The arrangement is not to be limited to the aforementioned examples.

It should be noted that as has been described in the first embodiment and others, for the alternation process, it is necessary to record on the disc, replacement information such as address correlation information between the alternative source address and the alternative destination (within the spare area) address. The present invention may also be applied to these processes and the recording region arrangement of the alternative recording managing information on the disc. By applying the present invention to recording of alternative recording managing information and recording region arrangement of the alternative recording managing information on the disc, it is possible to improve the reliability of the replacement process managing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus, configured to emit a laser light to record information onto an optical disc having a plurality of recording layers and a spare area on each of at least two of said recording layers, the apparatus comprising:

a pickup configured to emit a laser light to record information onto the optical disc;

a signal quality evaluation circuit configured to judge whether or not information recorded onto the optical disc by the pickup is defective;

a replacement process circuit configured to execute a replacement process after a judgment is made that information recorded onto the optical disc by the pickup is defective, and configured to control the replacement process so as to use a radial portion of a spare area on a recording layer that does not overlap a radial portion of a spare area on a higher priority recording layer.

2. The optical disc apparatus as claimed in claim 1, wherein the spare area existing on the higher priority recording layer has been recorded.

3. The optical disc apparatus as claimed in claim 1, wherein the spare area existing on the higher priority recording layer is not recorded.

4. A recording method, for applying a laser light to record information onto an optical disc having a plurality of recording layers and a spare area on each of at least two of said recording layers, the method comprising steps of:

emitting a laser light to record information onto the optical disc;

judging whether or not information recorded onto the optical disc by the pickup is defective; and performing a replacement process, after a judgment is made that recorded information is defective, by using a spare area on a recording layer at a radial position that is not superposed on a spare area existing on a higher priority recording layer.

5. The recording method as claimed in claim 4, wherein the spare area existing on the higher priority recording layer has been recorded.

6. The recording method as claimed in claim 4, wherein the spare area existing on the higher priority recording layer is not recorded.

* * * * *